United States Patent [19]

Matuoka

[11] 3,708,692

[45] Jan. 2, 1973

[54] RAMP VOLTAGE WAVE GENERATING CIRCUITS

[75] Inventor: Hideo Matuoka, Tokyo, Japan

[73] Assignee: Iwatsu Electric Company, Ltd., Tokyo, Japan

[22] Filed: May 4, 1971

[21] Appl. No.: 140,130

[30] Foreign Application Priority Data

May 7, 1970 Japan ....................45/38428

[52] U.S. Cl. ..................307/228, 328/128, 328/183, 328/185

[51] Int. Cl. ..................H03k 4/08

[58] Field of Search ......307/228; 328/127, 128, 183, 328/185

[56] References Cited

UNITED STATES PATENTS

| | | | |
|---|---|---|---|
| 3,339,088 | 8/1967 | Dillard | 328/185 X |
| 3,138,764 | 6/1964 | Dalton et al. | 328/128 UX |
| 3,569,998 | 3/1971 | Eguchi | 307/228 |
| 3,405,286 | 10/1968 | Mudie | 307/228 X |
| 3,408,580 | 10/1968 | Moriyasu | 307/228 X |
| 3,435,257 | 3/1969 | Lawrie, Jr. | 307/289 |

*Primary Examiner*—John Zazworsky
*Assistant Examiner*—R. C. Woodbridge
*Attorney*—Chittick, Pfund, Birch, Samuels & Gauthier

[57] ABSTRACT

In a ramp voltage wave generating circuit, there are provided a Miller's integrator including an amplifier, a capacitor connected in parallel with the amplifier and a resistor with one terminal connected to the input side of the amplifier; a source of constant current current connected to the other terminal of the resistor; first means for maintaining at a constant value the reference potential at the output terminal of the integrator in the absence of an input signal; second means for maintaining at the constant value the reference potential in the presence of the input signal; and a three terminal active element with two terminals connected to the second means and to the source of the input signal and the remaining terminal connected to a source of reference potential.

3 Claims, 4 Drawing Figures

INVENTOR

HIDEO MATUOKA

BY Chittick, Pfund, Birch, Samuels & Gauthier
ATTORNEY

INVENTOR

HIDEO MATUOKA

BY Chittick, Pfund, Birch, Samuels & Gauthier

ATTORNEY

RAMP VOLTAGE WAVE GENERATING CIRCUITS

BACKGROUND OF THE INVENTION

This invention relates to an improved circuit for generating a ramp voltage wave.

In order to have a better understanding of the invention, examples of prior art circuits will first be described. The prior circuit shown in FIG. 1 for generating a ramp voltage wave utilizes a Miller's integrator and comprises a source of input signal E*i*, diodes $D_1$ and $D_2$, a resistor $R_1$ connected between diode $D_1$ and the source E*i*, an amplifier $A_1$ having a gain $A_1$, a capacitor $C_1$ connected between the input and output of the amplifier, a DC source $Eb_1$ for providing a reference potential for determining the integrating operation at the output terminal $T_2$ of amplifier $A_1$ and a DC source $Eb_2$ connected to the input terminal $T_1$ of the amplifier.

The circuit shown in FIG. 1 operates as follows : Assuming that the input level of the amplifier $A_1$ in the absence of a step input from the source of input signal Ei is at zero potential, the current $I_T$ flowing through resistor $R_2$ from DC source $Eb_2$ flows into the source of input signal Ei via diode $D_1$ and resistor $R_1$. Denoting the terminal voltages across diodes $D_1$ and $D_2$ by $E_{D1}$ and $E_{D2}$, respectively, the reference potential at the output terminal $T_2$ of amplifier $A_1$ before initiating the integrating operation will be expressed by $-E_{D1}+E_{D2}+Eb_1$.

Upon application of the step input from the source of input signal Ei, diodes $D_1$ and $D_2$ which have been conducting are rendered OFF whereby the current $I_T$ through resistor $R_2$ flows into capacitor $C_1$. Thus, a ramp voltage wave of a predetermined inclination is generated at the output terminal $T_2$ of the amplifier $A_1$ following initiation of the integrating operation.

When the inclination of the ramp voltage wave is varied by varying the value of resistor $R_2$ or DC source $Eb_2$ so as to vary current $I_T$, flowing through resistor $R_2$, such an adjustment causes the voltage $E_{D1}$ across diode $D_1$ to vary so that it is impossible to maintain at a constant value the reference potential at the output terminal $T_2$ at instant when the ramp voltage wave begins to start.

FIG. 2 shows another prior art ramp voltage wave generating circuit designed to eliminate the defect described above, in which components identical to or functioning similarly as those shown in FIG. 1 are designated by the same reference symbols. The circuit shown in FIG. 2 comprises a comparator circuit COM including two PNP transistors $TR_1$ and $TR_2$ with their emitter electrodes coupled together. These emitter electrodes are connected to a DC bias source $Eb_3$ through a resistor $R_3$ whereas the base electrode of transistor $TR_2$ is connected to a source of reference potential $E_c$.

Comparator circuit COM corresponds to the DC source $Eb_1$ shown in FIG. 1. A biasing diode $D_3$ is connected to the collector electrode of transistor $TR_2$.

With this circuit, it is possible to maintain the reference potential at the output terminal $T_2$ at the voltage of the source of reference potential Ec connected to the base electrode of transistor $TR_2$ when the ramp wave is not being provided. Assuming a voltage amplification factor of $A_2$ of the collector electrode of transistor $TR_2$ with reference to the base electrode of transistor $TR_1$ it is possible to decrease to about $1/A_2$ variations in the reference potential at the output terminal which is caused by the variation in the voltage drop $E_{D1}$ across diode $D_1$ when the rampe wave is initiated. With this arrangement, however, where the voltage amplification factor $A_2$ is increased, or where the value of capacitor $C_1$ is decreased for the purpose of producing a high speed ramp voltage wave, the tendency of producing an oscillation is increased thus causing unstable operation. In an integrator comprising a conventional transistor the output is about 10 volts so that the voltage drop of a silicon diode usually amounting to 0.6 volt can not be neglected. Furthermore, in the prior art Miller's integrator when the capacitor $C_1$ is selected to have a value of about 50 PF for producing a high speed sweeping output, the construction of the circuit shown in FIG. 2 becomes complicated.

SUMMARY OF THE INVENTION

It is an object of this invention to provide a new and improved ramp voltage wave generating circuit which can eliminate the defects of the prior art circuits.

More specific object of this invention is to provide an improved ramp voltage wave generating circuit which can maintain at a constant value the reference voltage appearing at the output terminal when the ramp voltage wave begins to start.

Another object of this invention is to provide a ramp voltage wave generating circuit having little tendency of creating an oscillation so that it is suitable for effecting high speed sweeping.

According to this invention there is provided a ramp voltage wave generating circuit comprising a Miller's integrator including an amplifier, a capacitor connected in parallel with the amplifier, and a resistor with one terminal connected to the input side of the amplifier ; a source of constant current connected to the other terminal of the resistor ; first means for maintaining at a constant value the reference potential at the output terminal of the integrator in the absence of an input signal ; second means for maintaining at the constant value the reference potential of the output terminal of the integrator in the presence of the input signal ; and a three terminal active element with two terminals connected to the second means and to the source of the input signal respectively and the remaining terminal connected to a source of reference potential.

BRIEF DESCRIPTION OF THE DRAWINGS

In the accompanying drawings.

Throughout the drawings corresponding elements are designated by the same reference characters.

DESCRIPTION OF THE PREFERRED EMBODIMENT

Figure 1:
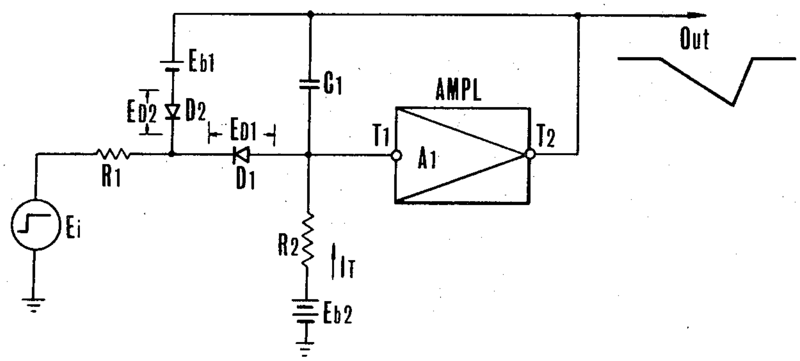
FIGS. 1 and 2 show two examples of prior art ramp voltage wave generating circuits.
Figure 2:
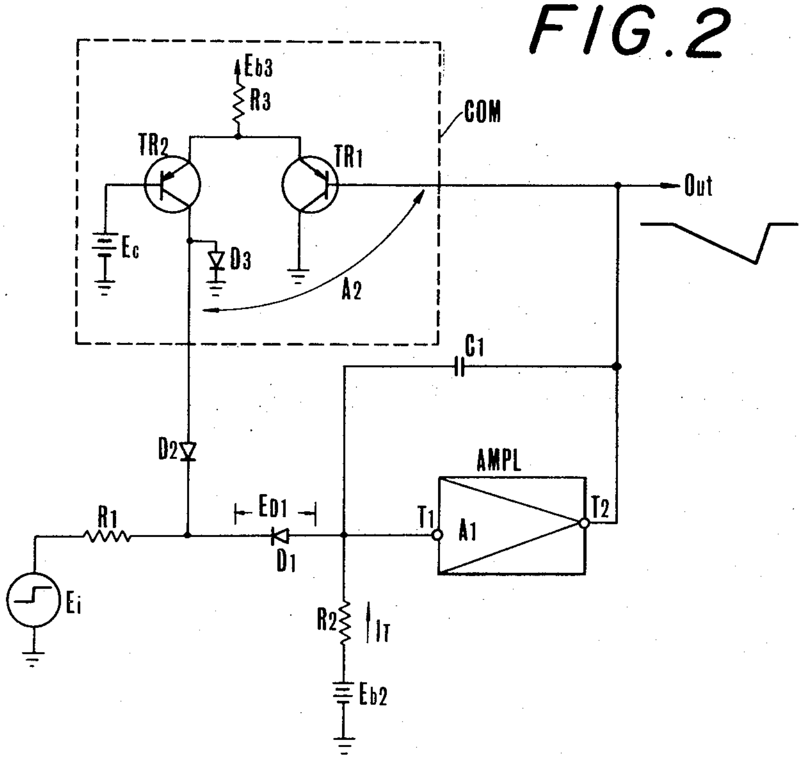
Figures 3, 4:
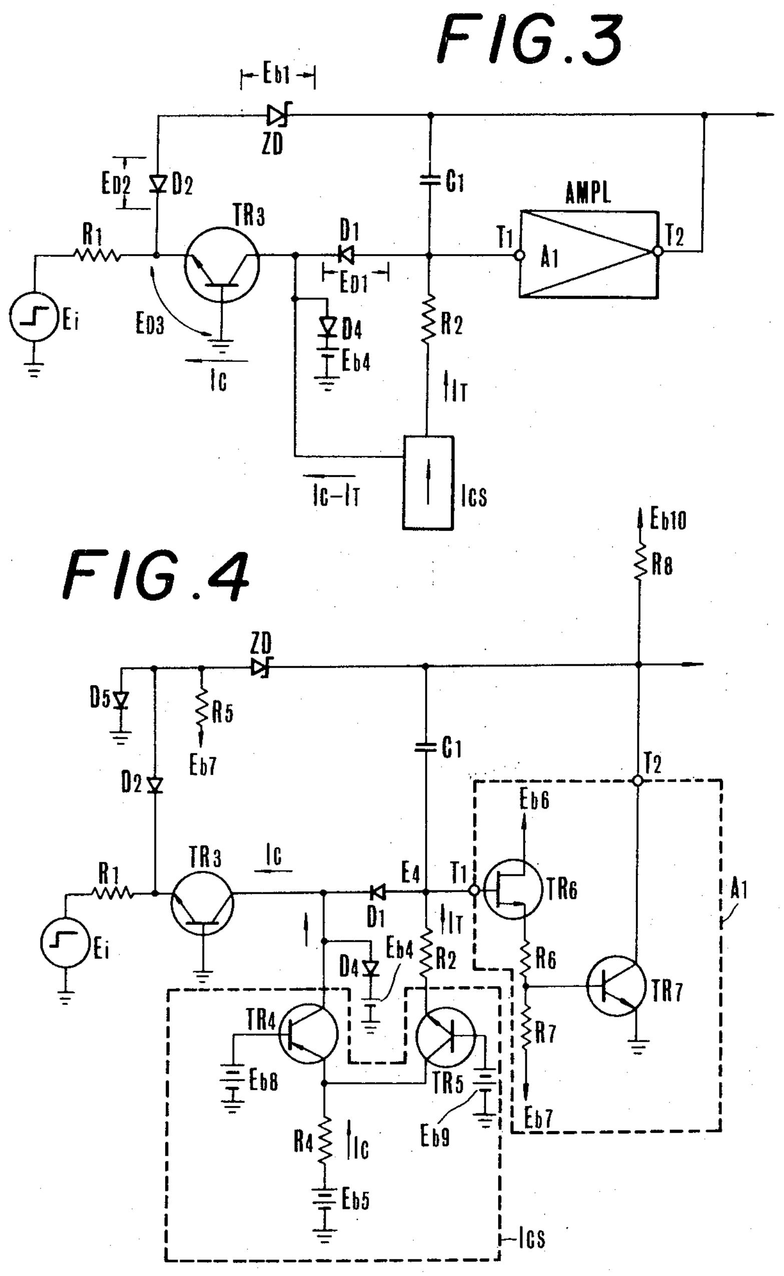
FIG. 3 shows a connection diagram of one example of a ramp voltage wave generating circuit embodying the invention and FIG. 4 shows a detailed connection diagram of the circuit shown in FIG. 3.

The preferred embodiment of the invention shown in FIG. 3 comprises a Zener diode ZD corresponding to DC source $Eb1$ shown in FIG. 1, a source of constant current Ics for producing constant current output Ic, a transistor $TR_3$, a diode $D_4$ and a source of direct current $Eb_4$. Another elements are identical to those shown in FIG. 1.

In the absence of a step input from the source of input signal Ei, both diodes $D_1$ and $D_2$ and transistor $TR_3$ are conductive so that current flows from the source of constant current I*cs* to the source of input signal Ei via resistor $R_2$, diode $D_1$, transistor $TR_3$ and resistor $R_1$. Further a current $(Ic - I_T)$ flows from source of constant current I*cs* to the source of input signal Ei via transistor $TR_3$ and resistor $R_1$. As a result, a constant current $(I_T + Ic - I_T) = Ic$ always flows through transistor $TR_3$ independently of current $I_T$. Thus, the emitter voltage $ED_3$ of transistor $TR_3$ is constant so that the reference potential at the output terminal $T_2$ at the beginning of the ramp voltage wave is maintained at a constant value equal to $(-ED_3 + ED_2 + Eb_1)$. Upon application of a step input from the source of input signal Ei transistor $TR_3$ is rendered OFF whereby the current $(Ic - I_T)$ flows through diode $D_4$ and current $I_T$ flows through capacitor $C_1$ thus producing a ramp voltage wave which is determined by current $I_T$ and capacitor $C_1$.

In FIG. 4 which shows the details of the connections of the circuit shown in FIG. 3, dotted line blocks I*cs* and $A_1$ show the details of constant current source I*cs* and amplifier $A_1$. Amplifier $A_1$ comprises a field effect transistor $TR_6$ with its drain electrode connected to source $Eb_6$ and a NPN type transistor $TR_7$ with its emitter electrode grounded. The source electrode of field effect transistor $TR_6$ and the base electrode of transistor $TR_7$ are interconnected through a base resistor $R_6$. The base electrode of transistor $TR_7$ is also connected to a source $Eb_7$ through a resistor $R_7$.

The constant current source Ics comprises a PNP type transistor $TR_4$, a NPN type transistor $TR_5$, sources $Eb_8$ and $Eb_9$ connected to the base electrodes of transistors $TR_4$ and $TR_5$, respectively, and a resistor $R_4$ connected between the emitter electrode of transistor $TR_4$ and a DC source $Eb_5$. The anode electrode of Zener diode ZD is connected to a biasing diode $D_5$ and a resistor $R_5$ which is connected to a source $Eb_7$. The output terminal of amplifier $A_1$ is connected to a source $Eb_{10}$ through a resistor $R_8$. Of course, the circuit shown in FIG. 4 operates in the same manner as that shown in FIG. 3. Where the transistors used in the circuit of FIG. 4 are of the silicon type, the emitter-base voltage of PNP type transistor $TR_4$ and the emitter-base voltage of NPN type transistors are equal to about 0.6 volt, respectively, so that current Ic flowing through resistor $R_4$ and transistor $TR_3$ is expressed by $Ic = [Eb_5 - (Eb_8 + 0.6)/R_4$ whereas current $I_T$ flowing through resistor $R_2$ by $I_T = [(Eb_9 - 0.6) + E_4/R_2]$, where $E_4$ represents the gate voltage of the field effect transistor $TR_6$.

As above described with the novel ramp voltage wave generating circuit it is possible to maintain at a precisely constant value the reference potential appearing at the output terminal $T_2$ at the commencement of the ramp voltage wave. Moreover as the circuit has little tendency for creating oscillation, the novel circuit is suitable for high speed sweeping so that it is applicable with good results to a high speed sweeping circuit of an oscilloscope or a delay circuit utilizing the ramp voltage wave.

While the invention has been shown and described in terms of a preferred embodiment it is to be understood that many changes and modifications may be made without departing from the true spirit and scope of the invention as defined in the appended claims.

What is claimed is:

1. A ramp voltage wave generating circuit comprising a Miller's integrater including an amplifier, a capacitor connected in parallel with said amplifier, and a resistor having one terminal connected to the input side of said amplifier; a source of constant current connected to the other terminal of said resistor; means for maintaining at a constant value the reference potential at the output terminal of said integrator in the absence of an input signal and for providing a ramp voltage at the output terminal of said integrator in the presence of said input signal; said means including a three terminal switching element with a terminal connected to said output terminal and to the source of said input signal, with another terminal connected to said constant current source and with the remaining terminal connected to a source of reference potential, said switching element being responsive to the absence of an input signal to pass a constant current from said constant current source, through said switching element to said input signal source to provide a constant voltage at said output terminal, said switching transistor being responsive to an input signal to cause a current to flow to said capacitor to produce a ramp voltage.

2. The ramp voltage wave generating circuit according to claim 1 wherein said three terminal switching element is a transistor.

3. The ramp voltage wave generating circuit according to claim 2 wherein the emitter electrode of said transistor is connected to said output terminal via a Zener diode and a diode and also to said source of input signal and the collector electrode of said transistor is connected to said source of constant current and also to said input terminal of said amplifier via another diode.

* * * * *